United States Patent
Hughes (10) Patent No.: US 9,549,203 B2
(45) Date of Patent: Jan. 17, 2017

(54) ERROR RECOVERY FOR VIDEO DELIVERY VIA A SEGMENTATION PROCESS

(71) Applicant: ARRIS Enterprises, Inc., Suwanee, GA (US)

(72) Inventor: Gary Hughes, Chelmsford, MA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 334 days.

(21) Appl. No.: 14/263,071

(22) Filed: Apr. 28, 2014

(65) Prior Publication Data

US 2015/0312594 A1    Oct. 29, 2015

(51) Int. Cl.
| | |
|---|---|
| H04N 19/66 | (2014.01) |
| H04N 19/68 | (2014.01) |
| H04N 21/44 | (2011.01) |
| H04N 21/4425 | (2011.01) |
| H04N 21/462 | (2011.01) |
| H04N 21/63 | (2011.01) |
| H04N 21/647 | (2011.01) |

(Continued)

(52) U.S. Cl.
CPC .............. *H04N 19/66* (2014.11); *H04N 19/68* (2014.11); *H04N 21/44016* (2013.01); *H04N 21/4425* (2013.01); *H04N 21/4622* (2013.01); *H04N 21/631* (2013.01); *H04N 21/64776* (2013.01); *H04N 21/8455* (2013.01); *H04N 21/8456* (2013.01); *H04N 21/8586* (2013.01)

(58) Field of Classification Search
None
See application file for complete search history.

(56) References Cited

U.S. PATENT DOCUMENTS 8,214,855 B2    7/2012 Pickens et al.
2010/0172420 A1*  7/2010 Prasad ............. H04N 21/42615
                                                375/240.26

(Continued)

FOREIGN PATENT DOCUMENTS

| EP | 2053848 A1 | 4/2009 |
|---|---|---|
| WO | 2012046090 A1 | 4/2012 |
| WO | 2013020709 A1 | 2/2013 |

OTHER PUBLICATIONS

PCT Search Report and Written Opinion for PCT/US2015/027963, mailed on Jun. 26, 2015.

(Continued)

*Primary Examiner* — Kate Luo
(74) *Attorney, Agent, or Firm* — Thomas A. Ward (57) ABSTRACT

A client device may receive encoded video via a transport stream based on a video coding protocol. When errors result in receiving the encoded video, the client device may use an Internet Protocol (IP) connection to recover from the error. For example, an encoder may insert markers inband in the transport stream, and a segmenter then segments the video using the markers. The content remains in the form of a continuous transport stream that is compatible with existing transport stream delivery mechanisms. When an error occurs, the client device can then determine a locator for a segment that can be used to recover from the error and requests the segment from a server through the IP connection. The server sends the segment to the client device at the level of the transport stream layer without adding another protocol layer to encapsulate the segment.

13 Claims, 5 Drawing Sheets

(51) Int. Cl.
*H04N 21/845* (2011.01)
*H04N 21/858* (2011.01)

(56) References Cited

U.S. PATENT DOCUMENTS

2012/0272281 A1* 10/2012 Ha ................... H04N 21/23439
    725/110
2013/0177072 A1* 7/2013 Shibahara ............... G06T 9/004
    375/240.03
2013/0254611 A1 9/2013 Amerga et al.

OTHER PUBLICATIONS

"Information technology—Dynamic adaptive streaming over HTTP (DASH)—Part 1: Media presentation description and segment formats", ISO/IEC DIS 23009-1, ISO/IEC JTC 1/SC 29, Aug. 30, 2011.

"Encoder Boundary Point Specification", Cable Television Laboratories, Inc., Document Control No. OC-SP-EBP-I01-130118, Jan. 18, 2013.

* cited by examiner

ERROR RECOVERY FOR VIDEO DELIVERY VIA A SEGMENTATION PROCESS

BACKGROUND

Broadcast or multicast delivery is frequently used to deliver video encoded using a compression standard in a transport stream, such as Motion Picture Experts Group (MPEG) transport streams, to a large number of client devices. Some delivery mechanisms include Internet Protocol television (IPTV) multicast, over-the-air broadcasts (e.g., advanced television systems committee (ATSC)), and direct-to-the-home (DTH) satellite (e.g., digital video broadcasting-satellite (DVB-S)). During the delivery, errors may result in the form of packet loss or corruption. Techniques for providing error resilience or recovery when the errors occur are needed. For example, clients may request a unicast retransmission of portions of the video. To enable this, the video is partitioned and encapsulated in an additional protocol layer, typically real-time transport (RTP). RTP encapsulation adds overhead and is not compatible with the transport stream-based delivery mechanisms used to transport the encoded video, such as the over-the-air broadcasts, satellite delivery, etc., because the RTP transport stream is a higher layer than the MPEG transport stream.

SUMMARY

Embodiments of the present invention provide a client device that can receive encoded video via a transport stream based on a video coding protocol. When errors result in receiving the encoded video, the client device can use an Internet Protocol (IP) connection to recover from the error. For example, the encoder can insert markers inband in the transport stream, and a segmenter then segments the video using the markers. The content remains in the form of a continuous transport stream that is compatible with existing transport stream delivery mechanisms. When an error occurs, the client device can then determine a locator for a segment that can be used to recover from the error and requests the segment from a server through the IP connection. The server sends the segment to the client device at the level of the transport stream layer without adding another protocol layer to encapsulate the segment.

DETAILED DESCRIPTION

Described herein are techniques for an error recovery system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide an error recovery mechanism that is compatible with services that deliver video through a transport stream delivery. A client device may receive encoded video via a transport stream based on a video coding protocol, such as MPEG or high-efficiency video coding (HEVC). When errors result in receiving the encoded video, the client device may use an Internet Protocol (IP) connection to recover from the error. For example, an encoder may insert markers inband in the transport stream, and a segmenter then segments the video using the markers. The content remains in the form of a continuous transport stream that is compatible with existing transport stream delivery mechanisms. When an error occurs, the client device can then determine a locator (e.g., a uniform resource locator (URL)) for a segment that can be used to recover from the error and requests the segment from a server through the IP connection. The server sends the segment to the client device at the level of the transport stream layer without adding another protocol layer to encapsulate the segment, such as by using RTP.

Figure 1:
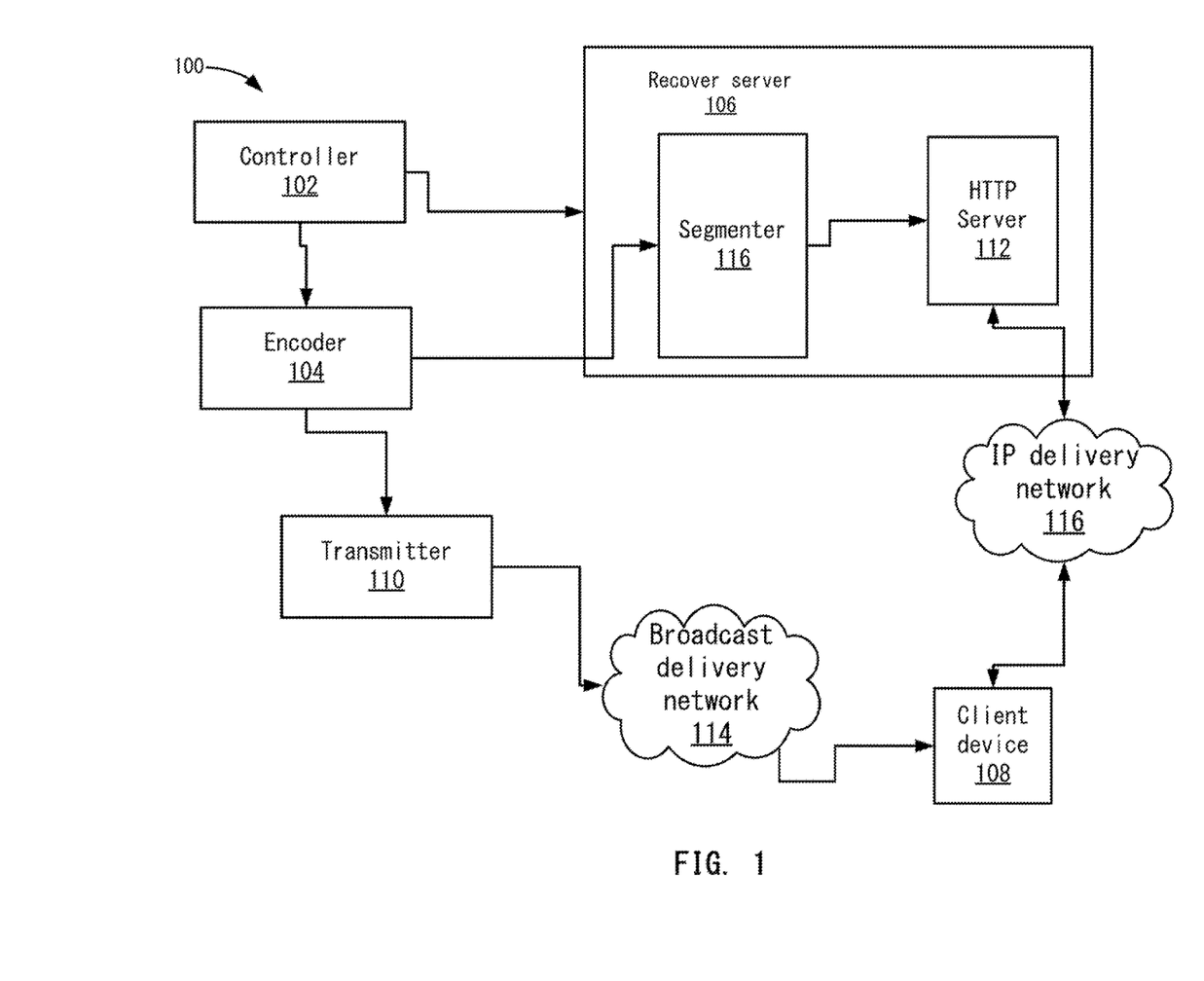
FIG. 1 depicts an example of a system for providing error recovery according to one embodiment.

FIG. 1 depicts an example of a system 100 for providing error recovery according to one embodiment. System 100 includes a controller 102, an encoder 104, a recovery server 106, and a client device 108. Controller 102, encoder 104, and recovery server 106 may be separate computing devices, be part of the same computing device or system, or have their functions distributed. Client device 108 also communicates with a transmitter 110 and a hypertext transfer protocol (HTTP) server 112 to receive encoded video from transmitter 110 and also error recovery segments from server 112 as will be described in more detail below.

In one example, client device 108 may access channels that include different programs, such as in a standard cable television lineup. Client device 108 may tune to different channels to view different programs. Each program may be an encoded video that is delivered to client device 108.

Controller 102 may control encoder 104 and recovery server 106. In one embodiment, controller 102 may be a dynamic adaptive streaming over HTTP (DASH) controller. Although DASH is described, other streaming protocols may be used, such as other adaptive streaming protocols that allow client devices to request different bitrates of video segments for a video depending on available bandwidth. In one embodiment, DASH supports a media streaming model for delivery of media content (e.g., video) in which control of the session lies with client device 108. Client device 108 may request segments of video using the HTTP protocol from standard web servers that have no DASH-specific capabilities. This allows client device 108 to request segments of the video without using an additional layer of protocol to transport the segments, such as RTP.

Encoder 104 may be an encoder or transcoder that can encode the video. As will be discussed in more detail below, encoder 104 may insert markers inband into the transport stream where the markers are used to indicate where segments should be determined. In one embodiment, inband may mean the markers are included in an encoded bitstream for the encoded video. Also, in one embodiment, the markers are encoder boundary point (EBP) markers. Transmitter 110 may then send the encoded video in a continuous transport stream through a broadcast delivery network 114, which may be an over-the-air network or cable delivery network. Also, in one embodiment, transmitter 110 may be an overthe-air transmitter. The continuous transport stream may mean that packets including the encoded video may not be encapsulated in another packet of an additional protocol layer. Client device 108 then receives the transport stream from broadcast delivery network 114, can decode the transport stream, and then play the video.

Recovery server 106 includes a segmenter 116 that receives the transport stream with the markers inserted inband from encoder 104 (or transmitter 110). Segmenter 116 then segments the video based on the markers into segments and makes them available to server 112. In one embodiment, server 112 may be part of recovery server 106 or may be separate from recovery server 106. Client device 108 can request the segments from server 112 through an IP delivery network 116 using an IP-based protocol, such as HTTP. In one embodiment, IP delivery network 116 may be a radio frequency (RF) radio network, such as a 4G radio network, but can be any IP-based network.

Client device 108 may be an IP-enabled client device, such as a television, smartphone, set top box, tablet device, or any other client device 108 that can receive the encoded video in a transport stream from transmitter 110 and also segments of the video from server 112. In this case, client device 108 can receive the video via the MPEG transport stream and also has IP connectivity. That is, client device 108 can receive the encoded video via broadcast or multicast technologies as its primary delivery path, but also has an available IP connection that client device 108 can use for error recovery to request individual segments.

To provide the error recovery, controller 102 may configure encoder 104 and segmenter 116. As described above, controller 102 configures encoder 104 to insert recovery information inband in the transport stream. In one embodiment, encoder 104 inserts a marker at fixed intervals, e.g., every 30 video frames, where the markers contain a time stamp, such as a coordinated universal time (UTC) time stamp that indicates a time within the video. Also, encoder 104 inserts a frequency descriptor in a table, such as an EBP descriptor in a program map table (PMT), that describes the frequency of the markers, which in turn defines the segment size. That is, the EBP descriptor may define that a marker may be inserted every 30 video frames. Finally, encoder 104 inserts a locator descriptor, such as a DASH-ER descriptor in the PMT, that specifies a locator (e.g., uniform resource locator (URL)) of a recovery presentation description, such as a media presentation description (MPD), and identifies which markers should be used for error recovery. The MPD describes to client device 108 how to formulate requests for segments when errors occur. For discussion purposes, the frequency descriptor will be described as an EBP marker, the time stamp as a UTC time stamp, and the locator descriptor as a DASH-ER descriptor, the recovery presentation description as the MPD, and the table as the PMT, but it will be understood that other markers and descriptors may be used.

Controller 102 also creates the recovery media presentation description (the recovery MPD), and provides the recovery MPD to recovery server 106. Recovery server 106 may make the recovery MPD accessible to server 112 for client device 108 to request. Then, client device 108 can retrieve the recovery MPD and use the recovery MPD to generate requests for segments during error recovery. In one embodiment, the recovery MPD includes a description of the encoded stream, a segment naming template using the UTC time stamps in the EBP, suggested client buffering requirements, and an MPD update interval that provides client device 108 with an interval to update the MPD. The recovery MPD will be described in more detail below.

Before the recovery process, encoder 104 generates a continuous transport stream carrying the encoded video and inserts EBP markers and additional descriptors, such as the EBP descriptor and a DASH-ER descriptor in the PMT as was configured by controller 102.

Figure 2:
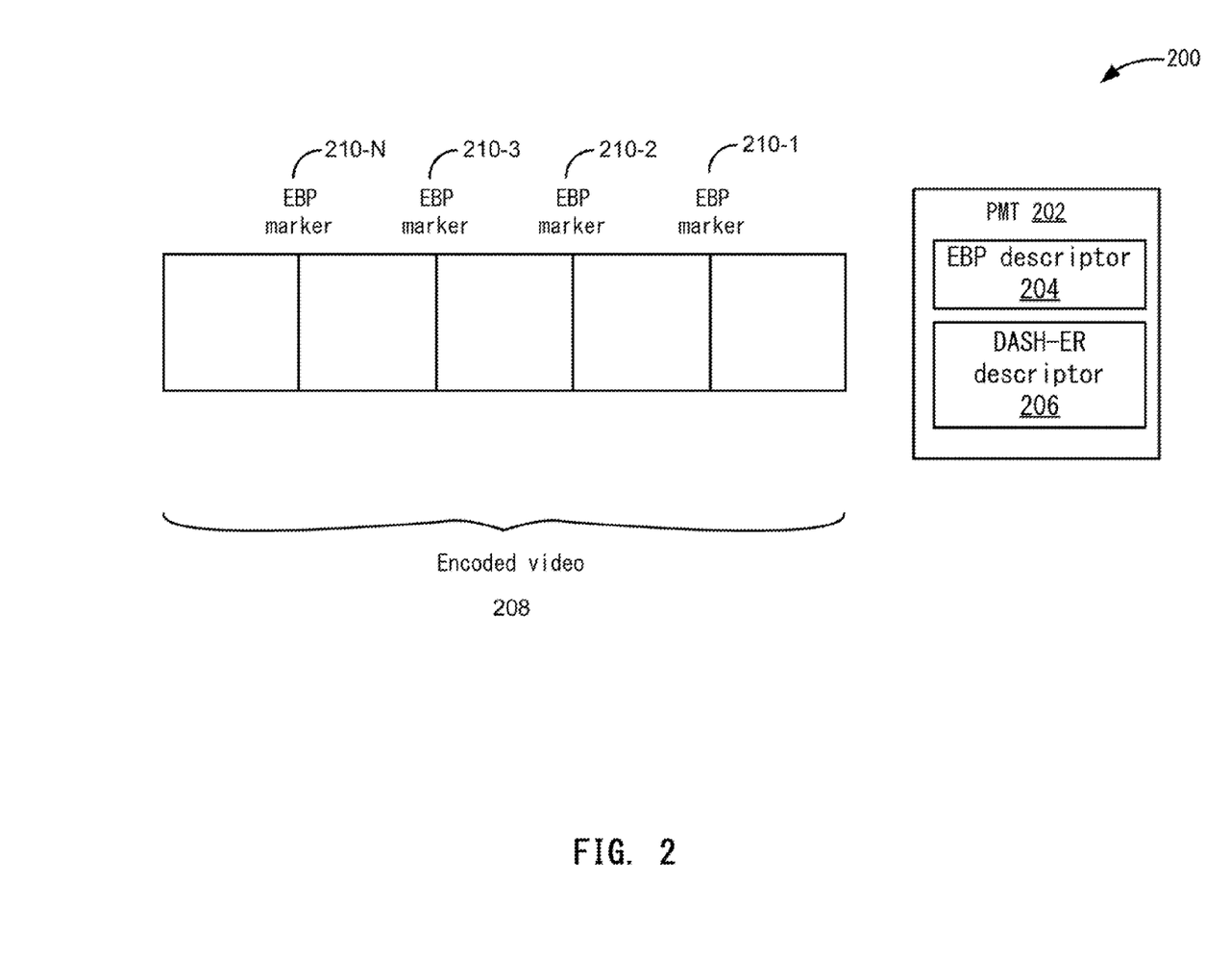
FIG. 2 depicts an example of a transport stream according to one embodiment.

FIG. 2 depicts an example of the transport stream 200 according to one embodiment. At 202, a PMT is shown. The PMT includes an EBP descriptor at 204 and a DASH-ER descriptor at 206. The PMT describes the single program associated with the transport stream, such as the video, and includes a unique packet identifier (PID) that identifies the program. The PID is used to identify packets that belong to the program. In one embodiment, client device 108 may obtain the PMT when the channel for the program is tuned to.

Transport stream 200 includes the encoded video at 208. Also, the PMT may be sent inband with transport stream 200 or be sent separately. Encoder 104 may insert EBP markers at various intervals in transport stream 200, such as intervals shown at 210-1, 210-2, 210-3, . . . , 210-N to indicate the segments inband with the encoded video.

Transmitter 110 may receive transport stream 200 and then send the packets including segments of the encoded video to client device 108 (and other client devices) through broadcast delivery network 114. In one embodiment, packets may be used to transport segments of the encoded video in a packetized elementary stream (PES). It should be noted that the packets of the transport stream are not encapsulated in a higher layer protocol when transmitted to client device 108. That is, the packets of the encoded video are not further encapsulated in another network layer packet.

Segmenter 116 also receives transport stream 200 from encoder 104. Segmenter 116 breaks transport stream 200 into segments based on the inband EBP markers shown at 210-1-210-N. Segmenter 116 then stores the segments with names derived from the UTC time stamp and the segment name template in the recovery MPB. For example, the recovery MPB defines the format of URLs for the segments that should be used by client device 108 to request segments. Segmenter 116 then makes the segments available via server 112.

Figure 3:
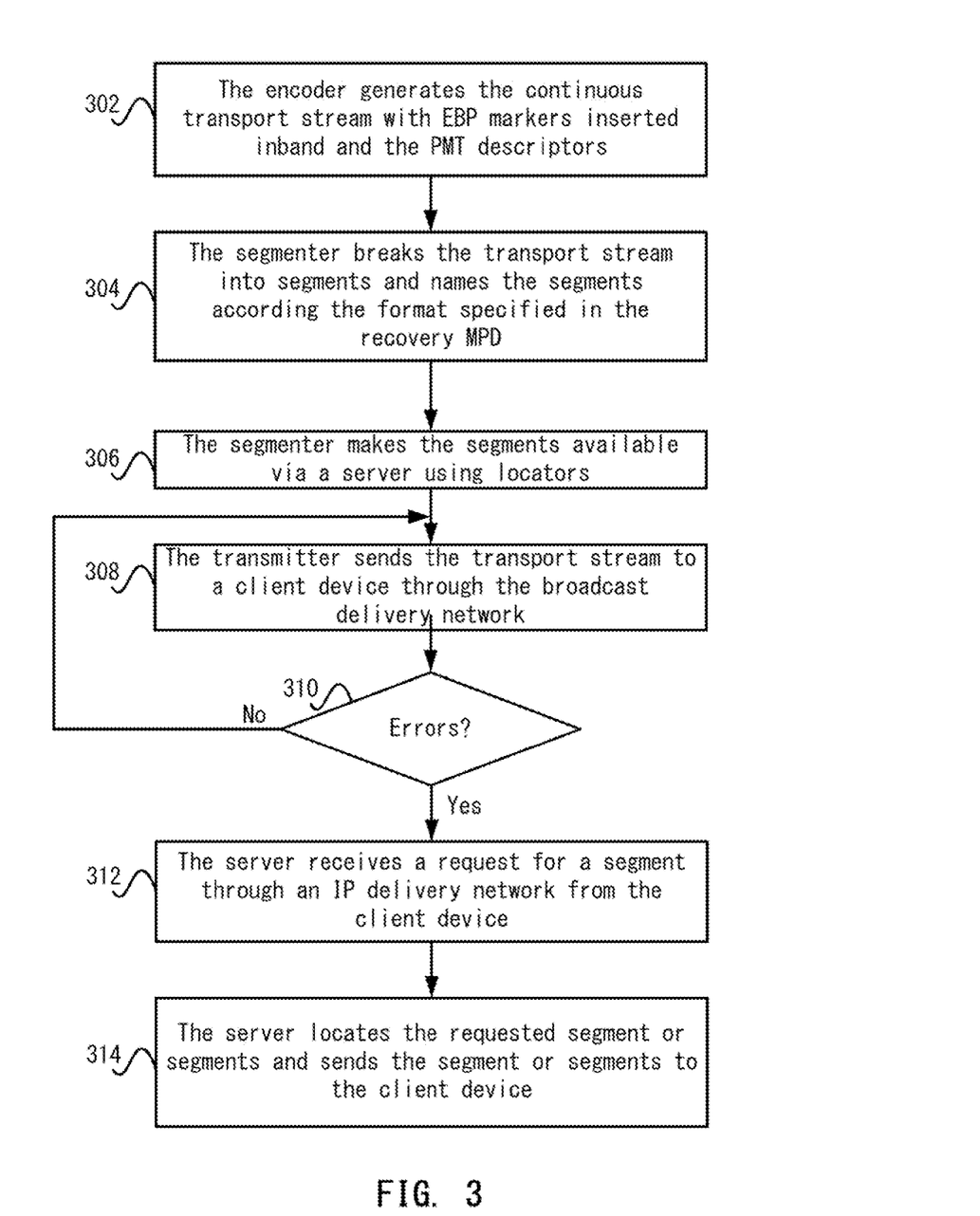
FIG. 3 depicts a simplified flowchart of a method for performing error recovery according to one embodiment.

FIG. 3 depicts a simplified flowchart 300 of a method for performing error recovery according to one embodiment. At 302, encoder 104 generates the continuous transport stream with EBP markers inserted inband and the PMT descriptors. At 304, segmenter 116 breaks the transport stream into segments and names the segments according the format specified in the recovery MPD. Then, at 306, segmenter 116 makes the segments available via server 112 using locators determined based on the recovery MPD.

At 308, transmitter 110 sends the transport stream to client device 108 through broadcast delivery network 114. For example, this may be the normal delivery mechanism client device 108 receives the video, such as an over-the-air network or a cable delivery network.

At 310, if no errors occur, then the process continues at 308 where the transport stream continues to be sent to client device 108. However, if an error results, server 112 receives a request for a segment through IP delivery network 116 from client device 108. In this case, client device 108 may identify an error with a portion of the transport stream received from transmitter 110. Then, client device 108 determines which segment needs to be requested and sends the request to server 112. After receiving the request, at 312, server 112 locates the requested segment or segments and sends the segment or segments to client device 108.

Figure 4:
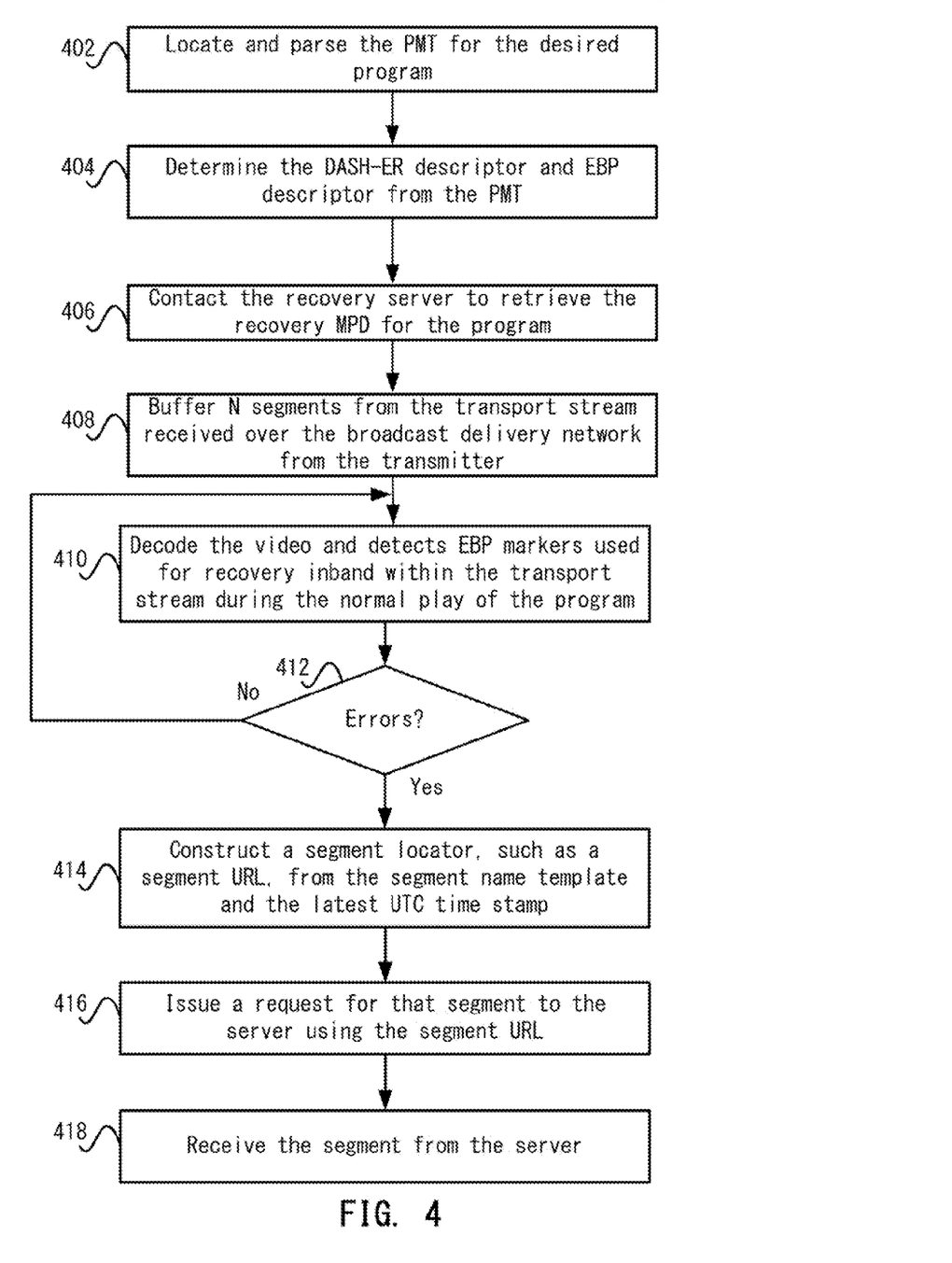
FIG. 4 depicts a simplified flowchart of a method for performing the error recovery process at a client device according to one embodiment.

The following describes the error recovery process from client device 108, which may initiate the error recovery process. FIG. 4 depicts a simplified flowchart 400 of a method for performing the error recovery process at client device 108 according to one embodiment. At 402, client device 108 locates and parses the PMT for the desired program. For example, during channel acquisition, client device 108 receives the PMT from transmitter 110. At 404, client device 108 determines the DASH-ER descriptor and EBP descriptor from the PMT. The DASH-ER descriptor allows client device 108 to determine the URL of the recovery MPD and the EBP descriptor identifies which EBP markers to use in error recovery.

Using the DASH-ER descriptor, at 406, client device 108 contacts recovery server 106 to retrieve the recovery MPD for the program. As discussed above, the recovery MPD includes a description of the encoded transport stream, a segment naming template, suggested client buffering requirements, and the MPD update interval. For the recovery interval, client device 108 may periodically refresh the recovery MPD to verify connectivity and detect any configuration changes that may occur. The frequency of this request may be controlled by a parameter, such as a parameter MPD@minimumUpdateInterval.

At 408, client device 108 then buffers N segments from the transport stream received over broadcast delivery network 114 from transmitter 110 before beginning the decode and presentation of the program. The value of N is derived from parameters in the MPD, such as a parameter MPD@suggestedPresentationDelay that may be specified during the setup. These N segments that are buffered may be encoded segments from the transport stream.

At 410, client device 108 decodes the video and detects EBP markers used for recovery inband within the transport stream during the normal play of the program. For example, as the encoded video is decoded, client device 108 detects EBP markers. Client device 108 records a latest value of the UTC time stamp carried in the EBP. Although the latest value is recorded, client device 108 may record a series of the time stamps or all of the time stamps.

At 412, client device 108 determines if an error occurs. If not, the process proceeds where client device 108 continues to decode the video at 410. However, if client device 108 detects an error has occurred, such as a transport stream continuity count error occurs, a marker is not received, or an error signal generated by a network access element occurs, at 414, client device 108 constructs a segment locator, such as a segment URL, from the segment name template and the latest UTC time stamp. This segment URL identifies a location of a segment that can be used to recover from the error. Using the IP protocol, such as DASH, client 108 is able to request individual segments to recover from the error instead of a stream of the video. As discussed above, client 108 leverages the IP connection to request the segment. At 416, client device 108 issues a request for that segment to server 112 using the segment URL. Server 112 receives the request, can process the request by retrieving the segment, and then send the segment. At 418, client device 108 receives the segment from server 112.

There may be some cases in which the requested segment may not yet be complete on recovery server 106. In this case, server 112 may provide a partial HTTP transfer or return an error status. This may cause client device 108 to retry the request. At some point, the requested segment may be completed and can be returned to client device 108.

Once client device 108 has received the segment, the contents may be used to replace the damaged segment in a buffer as delineated by the EBP markers. For example, the entire segment in the transport stream may be replaced and then decoded.

Figure 5:
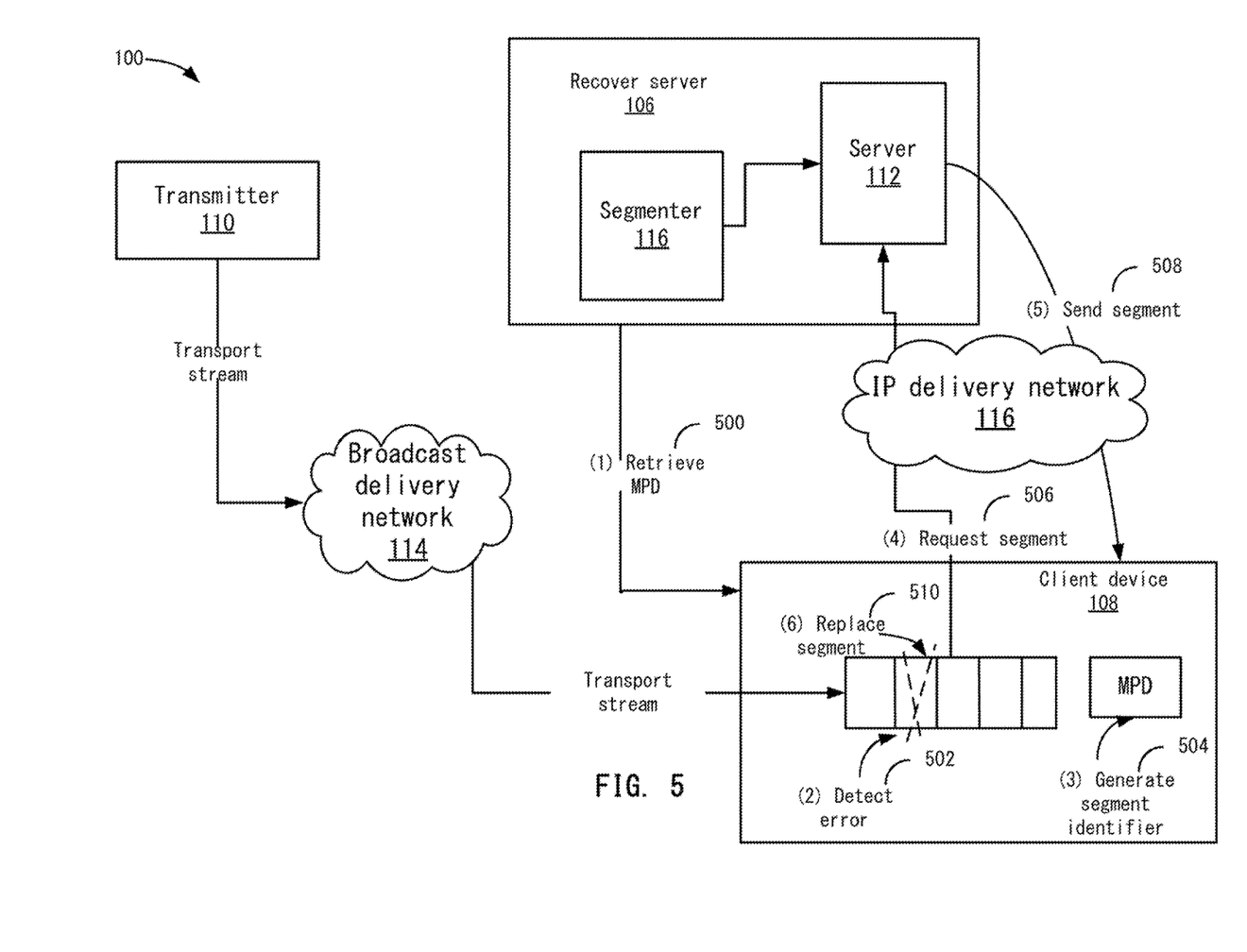
FIG. 5 depicts a more detailed example of the recovery process and replacing the segment according to one embodiment.

FIG. 5 depicts a more detailed example of the recovery process and replacing the segment according to one embodiment. During channel acquisition, such as a user switching to a channel in a television broadcast, in a step 1 (reference 500) client device 108 retrieves the MPD from server 112 or recovery server 106. In a step 2 (reference 502), client device 108 detects an error in the transport stream received from transmitter 110 through broadcast delivery network 114. This results in an error in buffering of the video in a buffer 503 in client device 108.

When the error occurs, in a step 3 (reference 506), client device 108 identifies and generates a segment identifier using the information in the MPD. As discussed above, client device 108 may use a time stamp and the naming convention from the MPD to generate the segment identifier. Also, if a network error results in the loss of an EBP, client device 108 may detect the loss as EBPs are expected at fixed intervals as specified in the EBP descriptor. In this case, client device 108 may infer the time stamp of the missing EBP and request the segments adjacent to the missing EBP. Then, in a step 4 (reference 508), client device 108 requests the segment from server 112. Previously, recovery server 106 may have generated the segments based on the EPB markers in the transport stream and made them available to server 112. In a step 5 (reference 510), client device 108 receives the segment from server 112 through IP delivery network 114.

In a step 6 (reference 512), client device 108 may replace the segment in buffer 503 in which an error occurred. Then, client device 108 can continue to retrieve the video from buffer 503 for decoding and playing. Because the segments used for recovery may be identical to the segments in the transport stream, client device 108 does not need to de-capsulate a higher level packet that encapsulates a transport layer packet including the segment. Rather, the transport stream is transported to client device 108 using the same protocol as the transport stream received through broadband delivery network 114.

In one embodiment, the segments used for recovery are identical to the virtual segments in the continuous transport stream prior to any network error. Thus, there are no constraints placed on alignment of the EBPs with group of pictures (GOP) structures or other coding parameters. In another embodiment, a user may wish to provide an alternate representation for use during recovery, such as one of several already encoded segments for adaptive bit rate delivery. In this instance, the primary recovery streams may be constructed to enable bit stream switching and information in the MPD may reflect this.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
 receiving, by a computing device, configuration information describing markers that delineate segments of a video;
 generating, by the computing device, an encoded version of the video;
 inserting, by the computing device, the markers inband in the encoded version of the video in a transport stream;
 sending, by the computing device, the transport stream including the encoded version of the video to a server, wherein the server segments the encoded version of the video based on the markers and identifies the segments; and
 sending, by the computing device, the transport stream including the encoded version of the video to a client device at a transport layer, wherein the client device requests a segment of the encoded version of the video from the server using an identifier for the segment upon determining an error with the transport stream, and receives the segment at the transport layer from the server,
 wherein the configuration information includes a locator descriptor specifying a location of a recovery presentation description that describes a naming convention for the identifier of the segment, the method further comprising:
 including the locator descriptor in a mapping table wherein the mapping table includes a frequency descriptor that describes a frequency of the markers to define a segment size; and
 sending the mapping table to the client device.

2. The method of claim 1, wherein the markers are encoder boundary point markers inserted inband with the encoded version of the video in the transport stream.

3. The method of claim 1, wherein each marker includes a timestamp for a time in the video.

4. The method of claim 1, wherein the locator descriptor specifies which markers should be used to generate the segments.

5. The method of claim 1, wherein the locator descriptor specifies a universal resource locator (URL) for requesting the recovery presentation description.

6. The method of claim 1, wherein the client requests the recovery presentation description from the server and uses the recovery presentation description to generate the identifier for the segment with a timestamp associated with a marker for the segment.

7. A method comprising:
 receiving, by a computing device, a transport stream of an encoded version of a video at a transport layer, the transport stream also being sent to a server; determining, by the computing device, markers that are located inband in the encoded version of the video in the transport stream;
 determining, by the computing device, an error associated with a segment in the encoded version of the video, wherein the segment is identified with a marker located inband in the transport stream;
 generating, by the computing device, a locator for the segment based on the marker;
 sending, by the computing device, a request for the segment using the locator to the server;
 receiving, by the computing device, the segment from the server via the transport layer where the server segmented the transport stream into segments based on the markers; and
 receiving a mapping table that includes a frequency descriptor that describes a frequency of the markers to define a segment size.

8. The method of claim 7, wherein: the encoded version of the video is received via a broadcast delivery network, and the segment is received via an IP-based network.

9. The method of claim 7, further comprising: receiving a mapping table that includes a locator descriptor specifying a location of a recovery presentation description that describes a naming convention for locators of segments for the encoded version of the video.

10. The method of claim 9, further comprising sending a request to the server for the recovery presentation description, wherein the naming convention is used to generate the locator for the segment along with a time stamp for the marker.

11. The method of claim 7, further comprising:
 buffering a set of segments from the encoded version of the video; and
 adding to the segment to the buffered set of segments to recover from the error.

12. The method of claim 7, wherein the error is detected based on a marker not being received in the encoded version of video.

13. The method of claim 7, wherein the locator is based on the naming convention and a timestamp for the segment.

* * * * *